United States Patent [19]

Lorence et al.

[11] Patent Number: 4,928,865

[45] Date of Patent: May 29, 1990

[54] BILATERAL BEVERAGE CONTAINER HOLDER

[75] Inventors: Brian S. Lorence, Warren; Richard A. Phelps, Ferndale; David N. Grabowski, Rochester Hills, all of Mich.

[73] Assignee: Chivas Products Limited, Sterling Heights, Mich.

[21] Appl. No.: 318,306

[22] Filed: Mar. 3, 1989

[51] Int. Cl.⁵ .............................................. A47C 7/62
[52] U.S. Cl. ...................................... 224/275; 211/71; 211/81; 224/277; 224/279; 224/281; 224/42.42; 224/42.44; 248/311.2; 297/194; 108/44
[58] Field of Search .............. 224/273, 275, 277, 279, 224/280, 281, 282, 42.42, 42.43, 42.44; 297/194; 108/44, 45, 46, 26, 33; 211/71, 85, 75, 78, 79, 80, 81, 82

[56] References Cited

U.S. PATENT DOCUMENTS

| | | | |
|---|---|---|---|
| 2,000,916 | 5/1935 | Bloom ................................. | 297/194 |
| 2,862,625 | 12/1958 | Norris ................................. | 211/74 |
| 3,039,616 | 6/1962 | Proffit ................................. | 211/71 |
| 3,215,467 | 11/1965 | McFarland et al. ................. | 297/194 |
| 3,338,629 | 8/1967 | Drees ................................. | 297/194 |
| 3,637,184 | 1/1972 | O'Brien ......................... | 248/311.2 X |
| 4,262,962 | 4/1981 | Yust ................................. | 297/194 |
| 4,417,764 | 11/1983 | Marcus et al. ..................... | 297/194 |
| 4,453,759 | 6/1984 | Kathiria ........................... | 108/44 X |
| 4,530,480 | 7/1985 | Pratt ............................... | 248/311.2 |
| 4,548,326 | 10/1985 | Danna et al. ...................... | 211/71 |
| 4,589,711 | 5/1986 | Plank ............................... | 312/330 R |
| 4,613,048 | 9/1986 | McGill .............................. | 211/71 |
| 4,719,764 | 1/1988 | Cook ................................. | 62/261 |
| 4,733,908 | 3/1988 | Dykstra et al. .................... | 297/194 |
| 4,738,423 | 4/1988 | DiFilippo et al. ................. | 248/311.2 |
| 4,792,174 | 12/1988 | Shioda .............................. | 224/42.42 |
| 4,792,184 | 12/1988 | Lindberg et al. ................... | 297/194 |
| 4,818,017 | 4/1989 | Dykstra et al. .................... | 297/194 |
| 4,819,843 | 4/1989 | Nakayama .................... | 224/42.45 R |
| 4,826,058 | 5/1989 | Nakayama ...................... | 224/42.44 |

FOREIGN PATENT DOCUMENTS

| | | | |
|---|---|---|---|
| 3143957 | 5/1983 | Fed. Rep. of Germany ...... | 297/194 |
| 0164821 | 10/1982 | Japan .............................. | 224/42.42 |

*Primary Examiner*—Ernest G. Cusick
*Attorney, Agent, or Firm*—Townsend and Townsend

[57] ABSTRACT

A bilateral beverage container (2) mounts within a hinged vehicle armrest (4). The container has an upper container housing (22), a lower container housing (26) and a hinged game surface (24) therebetween suitable for playing board games upon. The upper container housing includes a flap (34) that defines a compartment suitable for storing writing paper, magazines and the like. The lower container housing includes fixed and user-definable compartments (48, 50) for storing beverage containers (76), game pieces and other objects, and hinged lids (60) to cover the fixed compartments. The lower container housing includes a hinged bilateral tray (62) with openings (68) sized to receive beverage containers. The bilateral tray holds beverage containers in both a stowed position, overlying the hinged lids covering the fixed compartments, and in a deployed position, spaced apart from the lower container housing. A pivotally attached stirrup assembly (70) pivotally deploys from the bilateral tray when the tray is in the deployed position, to provide horizontal support for beverage containers within the openings in the tray.

19 Claims, 3 Drawing Sheets

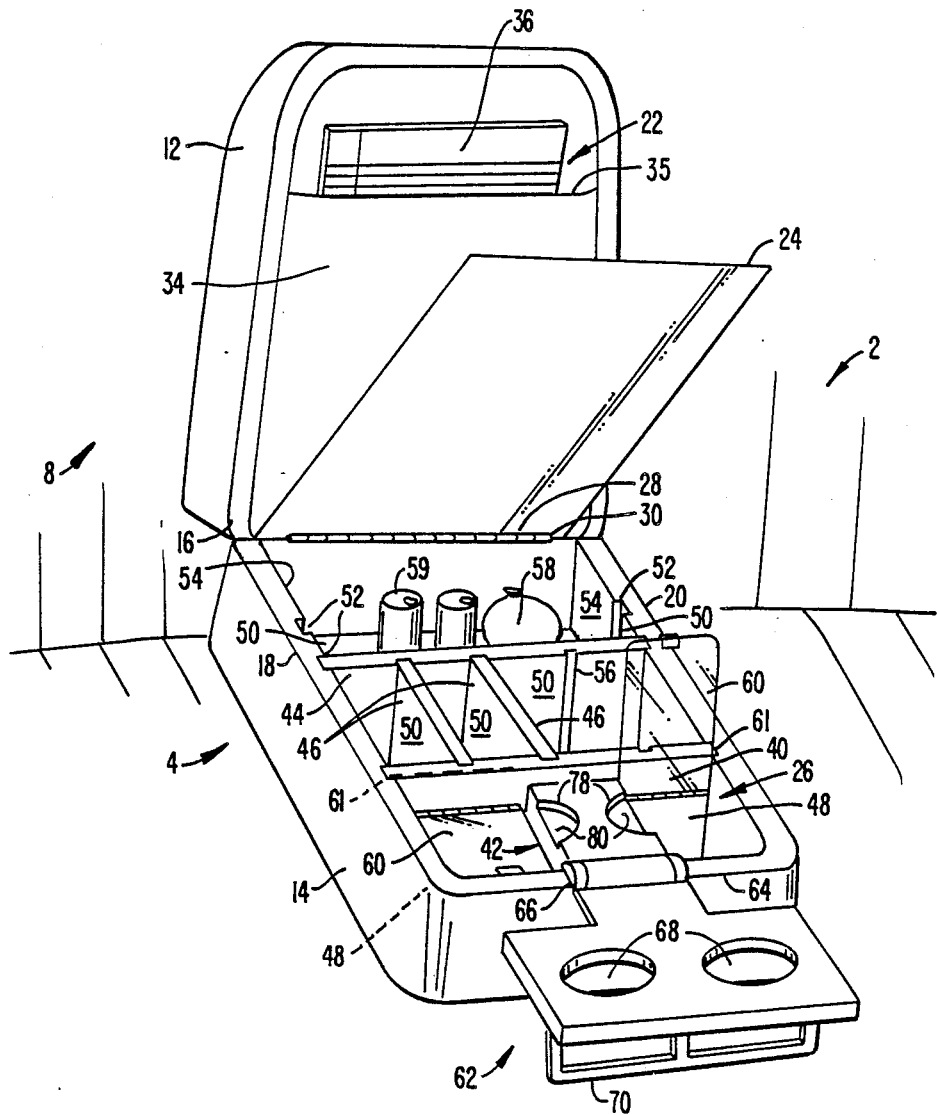
FIG.—1.

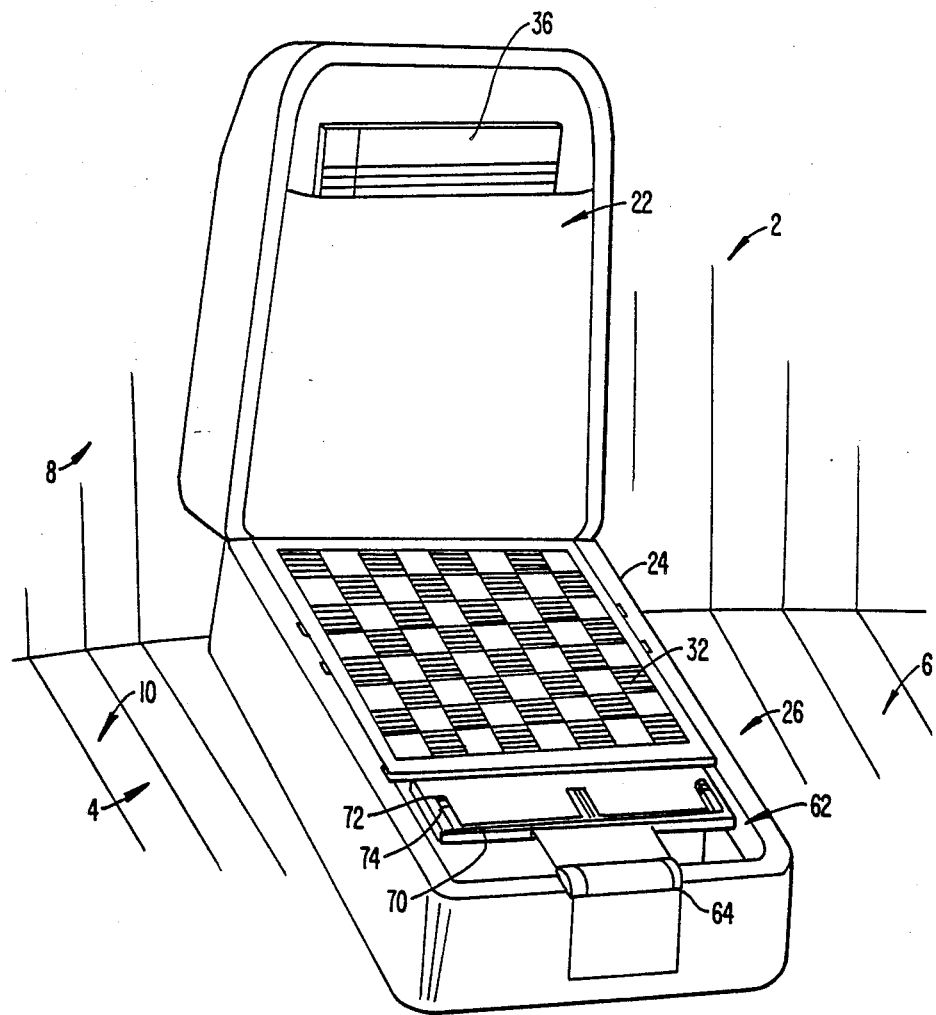
FIG._2.

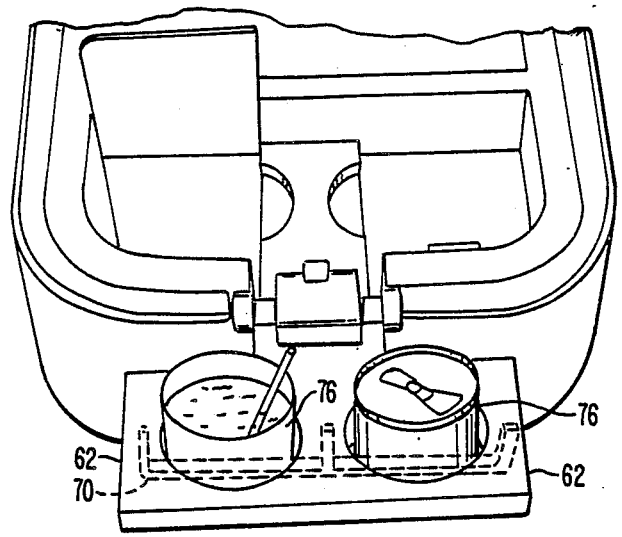
FIG._3A.
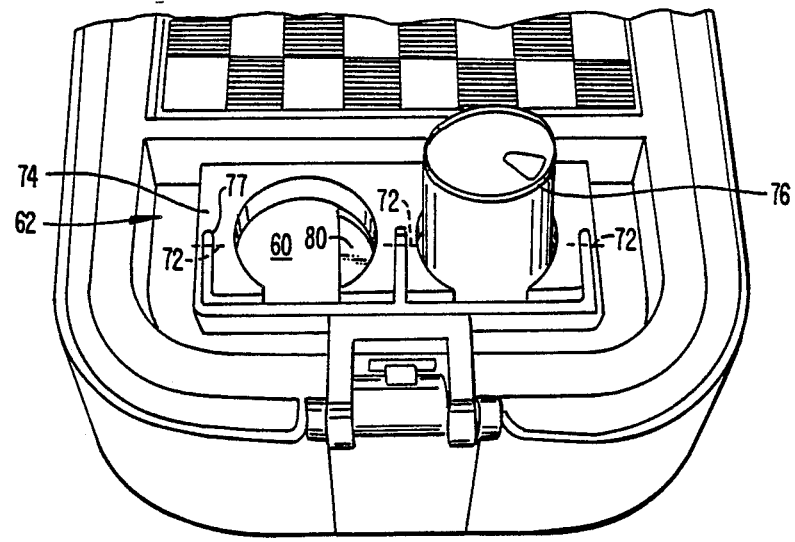
FIG._3B.

BILATERAL BEVERAGE CONTAINER HOLDER

BACKGROUND OF THE INVENTION

This invention relates to motor vehicle accessories, and more particularly to an armrest-beverage container assembly for use in a motor vehicle.

As the cost of motor vehicles continues to rise, consumers increasingly expect the vehicle they purchase to provide more of the creature comforts found at home. Fulfilling this desire becomes more difficult, however, as vehicles become more compact, in an effort to hold down weight and costs.

Beverage container or cupholder assemblies that are concealable within the armrest of a motor vehicle are known in the art. Frequently such devices slide, or otherwise retract, into the armrest, such as the apparatus disclosed by Dykstra in U.S. Pat. No. 4,773,908. While such devices hold a beverage container, they do little else. Known armrest-beverage container assemblies tend to be dedicated to the single task of holding a beverage container. Further, such assemblies in general do not make optimum use of the space available within the armrest.

SUMMARY OF THE INVENTION

The present invention is a bilateral beverage container holder concealably mounted within a vehicle armrest of the type having an upper member hingedly attached to a lower member.

The bilateral beverage container includes an upper container housing and a lower container housing which mount, respectively, in the upper and lower armrest members.

The upper container housing includes an attached flap which, together with the upper container housing, defines a compartment for storing writing tablets, magazines and the like.

The bilateral beverage container includes a lid which is hingedly disposed between the upper and lower housings of the armrest. The lid is preferably planar and may include incidia defining a game playing surface on its upper-most surface (i.e., a chess board).

The lower container housing defines a number of compartments sized to store objects such as beverage containers (i.e., beverages, cans, cups), game pieces (i.e., chessman) and the like. The size of these compartments may be user defined by positioning compartment partitions. The lower container housing further includes at least one hinged lid for covering fixed compartments at the front-most end of the container and providing horizontal support beverages or containers. When the hinged lid is in an open, out of the way, dispositoin, the front-most compartments are open to receive and store objects such as beverages, containers or game pieces. When the hinged lid is in a closed disposition, it closes the front-most container.

The lower container housing further includes a bilateral several tray that is hinged to the front-most edge of the lower container housing. The beverage tray includes one or more openings for receiving beverage cans or other beverage containers. A first surface of the beverage tray preferably includes a recess and a hinged stirrup assembly. When the beverage tray is in a stowed or first position, the stirrup assembly is stowed within the recess.

The beverage tray is bilateral in the sense that beverage containers may be held when the tray is deployed in a first, stowed, position, lying over the lower container housing. Further, beverage containers may be held when the tray is in a second, deployed, position, extending outwardly of and vertically offset from the front-most edge of the lower container housing. When the tray is in the first position and the hinged lid is in its closed disposition directly under the tray, the lid provides a support base for a beverage container placed within the opening in the tray. When the tray is in the second position, the stirrup assembly automatically deploys to provide horizontal support for the bottom of the beverage containers in the tray. This keeps the containers from sliding out through the opening in the tray.

The present invention advantageously provides a compact bilateral beverage holder in an arm rest assembly, permitting both the storage and holding for use of beverage containers. The present invention further provides a number of storage compartments within the arm rest assembly, and provides a game playing surface.

Other aspects, features and advantages of the invention will appear from the following description, wherein the preferred embodiment is set forth in detail in conjunction with the accompanying drawings.

BRIEF DESCRIPTION OF THE FIGURES

FIG. 1 is a perspective view of a bilateral beverage container according to the present invention with the lid raised, the flap open and the tray in the outwardly extending, deployed position.

FIG. 2 is a second perspective view of the bilateral beverage container of FIG. 1 with the lid lowered, the flap secured and the tray in its stowed position.

FIG. 3A and FIG. 3B are detailed perspective views of the tray in use in the deployed position of FIG. 1 and the stowed position of FIG. 2.

DETAILED DESCRIPTION OF THE PREFERRED EMBODIMENT

FIGS. 1 and 2 show a bilateral beverage container, shown generally as 2, mounted in a hinged armrest 4 located on an automobile seat 6. Armrest 4 may be of the type that is stowable in a vertical position, substantially flush with the back portion 8 of seat 6. Armrest 4 may also be permanently disposed substantially parallel to the horizontal portion 10 of seat 6.

Armrest 4 has an upper housing 12 hingedly attached to a lower housing 14. In the embodiment shown, upper and lower housings 12 and 14 are attached at a rear-most edge 16. However, the attachment could be made at, for example, a side edge 18 or a side edge 20 as well.

Bilateral beverage container 2 includes an upper container housing 22, a preferably planar lid 24 and a lower container housing 26. Upper container housing 22 is mounted within the upper housing 12, and lower container housing 26 is mounted within lower housing 14. The planar lid 24 is mounted at a rear edge 28 with hinge 30 to the upper or lower container housings 22 and 26. Planar lid 24 optionally includes a game playing surface 32 with indicia thereon for playing board games such as chess or checkers. Alternatively, lid 24 could be adapted for playing a variety of board games by, for example, embedding magnets in lid 24 for magnetically retaining a chosen one of several metal boards bearing various game playing indicia.

The upper container housing 22 includes a resiliently attached flap 34 which defines a compartment 35 with the upper container housing 22 for storing writing tablets 36, magazines or similar objects.

The lower container housing 26 includes a fixed internal wall 40, a fixed buttress 42, a major partition wall 44 and one or more minor partition walls 46. This structure defines two fixed compartments 48, and a number of user-definable compartments 50. Compartments 50 are defined by the positions of the partitions 44 and 46 and may be large or small, few or many, as the user desires. Major partition wall 44 is mounted within a chosen pair of slots 52 located on the inside wall 54 of the lower containers housing 26. Slots 52 are sized to frictionally secure wall 44 in any desired disposition. Wall 44 in turn carries a number of slots 56 which are sized to frictionally retain minor partition walls 46 in any chosen disposition.

In one preferred embodiment, several pairs off slots 56 are sufficiently wide to frictionally retain audio cassettes thereby securing the cassettes within the bilateral beverage container 2. The user defined compartments 50 and the fixed compartments 48 are suitable for storing various objects such as chessmen or other game pieces 58, beverage containers 59, or any other objects of suitable size.

The fixed compartments 48 are coverable with lids 60 which are attached with dowel hinges 61 to the inside wall 54 and to the buttress 42. Alternatively, lids 60 may be attached with conventional hinges. In a first position, lids 60 are substantially horizontal and cover compartments 48. In a second position, lids 60 may be hinged substantially 90° to provide access to compartments 58. FIG. 1 shows, for example, the right-hand lid 60 in a substantially 90° position, while the left-hand lid 60 is substantially horizontal, covering the left-hand compartment 48. When in a substantially horizontal disposition, the upper-most surface of the lid 60 provides a horizontal support surface.

The lower container housing 26 further includes a bilateral beverage tray 62 attached with a hinge 64 to the front-most edge 66 of the lower container housing 26. Tray 62 includes one or more openings 68 sized to receive a beverage container 76, such as a can or cup as shown in FIGS. 3A and 3B.

A stirrup assembly 70 is attached by a hinge dowel 72 to a first surface 74 of tray 62 generally beneath openings 68; see FIG. 2 and FIG. 3B. When not deployed, stirrup assembly 70 lies substantially flush in a recess channel 77 in surface 74 of tray 62. The stirrup assembly 70 preferably forms a single, somewhat U-U shaped member as shown in FIG. 1. With reference to FIGS. 1 and 3A, stirrup assembly 70 hinges downwardly when tray 62 is hinged into a second position extending away from front edge 66 of lower container housing 26, vertically offset from housing 26. So deployed, stirrup 70 provides a horizontal support for a container 76 held by tray 62, as shown in FIG. 3A. Movement of stirrup 70 is preferably by gravity. If desired springs. and appropriate detents or catches may be used instead of relying on gravity to position stirrup 70.

The beverage tray 62 is bilateral in the sense that it functions to support beverage containers 76 when deployed in the extended or second position shown in FIG. 1 and FIG. 3A, or when stowed in the first position shown in FIG. 2 and FIG. 3B. In the stowed position, lids 60 are first disposed in a substantially horizontal position such that the upper-most surface of lids 60 provide a horizontal support surface, and tray 62 is then hinged in a substantially horizontal disposition over the lids 60. See FIG. 3B. In this first position, tray 62 is spaced apart from lids 60, and performs a tray-like support function together with lids 60. A portion of the top-most surface 78 of buttress 42 also provides a horizontal support for containers placed in openings 68. With reference to FIG. 1, surface 78 of buttress 42 may include a semi-circular recess 80 which preferably underlies the circular opening 68 in tray 62 when the tray 62 is in the stowed position. The semi-circular recess 80 somewhat deepens the support provided by openings 68 to beverage containers 76 and provides a more stable support.

The present invention advantageously provides a compact bilateral beverage container holder in an arm rest assembly, permitting the storage and holding of beverage containers.

Further, the present invention advantageously provides a number of storage compartments within the arm rest assembly, and provides a game playing surface.

Modifications and variations may be made to the disclosed embodiment without department from the scope of the invention as defined by the following claims.

What is claimed:

1. A vehicle arm rest for use with a beverage container, comprising:
    a lower member defining an interior therein;
    an upper member hinged to the lower member for movement between an open position, providing access to the interior, and a closed position, substantially covering the interior; and
    a bilateral beverage holder, hingedly attached to the lower member for movement between first and second positions, the first position being vertically aligned with a portion of the interior, the second position being vertically offset from the interior, the bilateral beverage holder including a tray member movable with said bilateral beverage holder between the first and second positions, said tray member defining an opening for receiving a beverage container when the tray member is in either the first or second positions.

2. The vehicle arm rest of claim 1 wherein the lower member includes a front edge and wherein the bilateral beverage holder is pivotally attached to the front edge.

3. The armrest of claim 1, wherein the bilateral beverage holder further includes a stirrup assembly, hingedly attached to tray member to provide vertical support for a beverage container located within the opening in the tray member when the tray member is disposed in the second position.

4. The armrest of claim 3, wherein the tray member defines a recessed channel sized to house the stirrup assembly in a substantially flush disposition when the tray member is in the first position.

5. The armrest of claim 1, further including a flap, attached to the upper member and defining therebetween a storage compartment.

6. The armrest of claim 1, further including a first lid, hingedly attached to a chosen one of the upper and lower members and disposed therebetween.

7. The armrest of claim 6, wherein a surface of said first lid includes game playing indicia for the playing of board games thereon.

8. The armrest of claim 1, further including an internal wall, disposed within the lower member so as to divide the lower member into compartments.

9. The armrest of claim 8, further including a second lid, pivotally attached to the lower housing, for covering a top of at least one of the compartments.

10. The vehicle arm rest of claim 1 wherein the tray member includes a first surface and a second surface and wherein the first surface is oriented upwardly when the tray member is in the first position for receipt of the beverage container, the tray member being pivotable approximately 180° from the first position to the second position and wherein the second surface is oriented upwardly when the tray member is in the second position for receipt of the beverage container.

11. A vehicle arm rest for use with a beverage container, comprising:
 a lower member defining an interior therein; an upper member hinged to the lower member for movement between an open position, providing access to the interior, and a closed position, substantially covering the interior;
 a bilateral beverage holder hingedly attached to a front-most edge of the lower member for movement between first and second positions, the first position being within and vertically aligned with a portion of the interior, the second position being vertically offset from the interior, the bilateral beverage holder including:
 a tray member defining an opening for receiving a beverage container when the beverage holder is either in the first or second position; and
 a stirrup assembly, hingedly attached to the tray member, for movement between a stowed position, parallel to the tray member when the beverage holder is in the first position, and a use position, generally perpendicular to the tray member when the beverage holder is in the second position to provide a horizontal support for a beverage container located within the opening in the tray member.

12. The armrest of claim 11, wherein the tray member is movable with said bilateral beverage holder between the first and second positions and wherein a first surface of the tray member defines a recessed channel sized to house the stirrup assembly when the tray member is in the first position.

13. The armrest of claim 11 wherein said tray member is movable with said bilateral beverage holder between the first and second positions, the armrest further including a lid hingedly attached to the lower member for movement between a substantially horizontal disposition and a substantially vertical disposition,
 said lid being disposed horizontally and generally beneath the opening in the tray member when the tray member is in the first position, said lid providing a horizontal support surface for a beverage container located within the opening when said lid is in its horizontal disposition.

14. The armrest of claim 13 wherein the lower member includes buttress with a substantially horizontal surface that defines a semicircular recess disposed parallel to and generally beneath the opening in the tray member when the tray member is in the first position;
 said semicircular recess lying adjacent and on a common horizontal plane with the lid;
 said semicircular recess and said lid providing a horizontal support surface for a beverage container located within the opening, thereby stabilizing support for the container.

15. The container holder of claim 11 wherein the tray member includes a first surface and a second surface and wherein the first surface is oriented upwardly when the tray member is in the first position for receipt of the beverage container, the tray member being pivotable approximately 180° from the first position to the second position and wherein the second surface is oriented upwardly when the tray member is in the second position for receipt of the beverage container.

16. A container holder for use in a vehicle armrest of the type having an upper member hinged to a lower member, the container holder comprising:
 an upper housing, adapted for mounting in the upper member of the armrest;
 a lower housing, adapted for mounting in the lower member of the armrest, hingedly attached to the upper housing;
 a bilateral beverage holder, hingedly attached to a front-most edge of the lower housing, including:
 a tray member defining an opening sized for receiving a beverage container;
 the tray member adapted to hold a beverage container when disposed in a first position stowed over and vertically aligned with the lower housing, and when disposed in a second position extending outwardly from and vertically offset with the lower housing.

17. The container holder of claim 16, wherein the bilateral beverage holder further includes:
 a stirrup assembly, hingedly attached to a first surface of the tray member;
 the first surface of the tray member defining a recessed channel sized to house the stirrup assembly in a substantially flush disposition when the tray member is in the first position;
 the stirrup assembly deploying so as to provide a horizontal support for a beverage container located within the opening in the tray member when the tray member is disposed in the second position.

18. The container holder of claim 16, further including a lid hingedly attached to the lower member of movement between a substantially horizontal disposition in a substantially vertical disposition,
 said lid being disposed horizontally and generally beneath the opening in the member when the tray member is in the first position, said lid providing a horizontal support surface for a beverage container located within the opening when said lid is in its horizontal disposition.

19. The container holder of claim 16, wherein the lower member includes a buttress with a substantially horizontal surface that defines a semicircular recess disposed parallel to and generally beneath the opening in the tray member when the tray member is in the first position;
 said semicircular recess and lying adjacent and on a common horizontal plane with the lid;
 said semicircular recess and said lid providing a horizontal support surface for a beverage container located within the opening, thereby stabilizing support for the container.

* * * * *